C. G. BALDWIN.

Lawn Mower Attachment.

No. 9,577. Reissued Feb. 15, 1881.

Witnesses:

A. F. Kercher

A. P. Grant

Inventor:

C. G. Baldwin, by John A. Wiedersheim

ATTORNEY.

N. PETERS, PHOTO-LITHOGRAPHER, WASHINGTON, D. C.

UNITED STATES PATENT OFFICE.

CYRUS G. BALDWIN, OF RIPON, WISCONSIN.

LAWN-MOWER ATTACHMENT.

SPECIFICATION forming part of Reissued Letters Patent No. 9,577, dated Febuary 15, 1881.

Original No. 228,854, dated June 15, 1880. Application for reissue filed October 4, 1880.

*To all whom it may concern:*

Be it known that I, CYRUS G. BALDWIN, a citizen of the United States, residing at Ripon, in the county of Fond du Lac, State of Wisconsin, have invented a new and useful Improvement in Lawn-Mower Attachments, which improvement is fully set forth in the following specification and accompanying drawings, in which—

Figure 1:
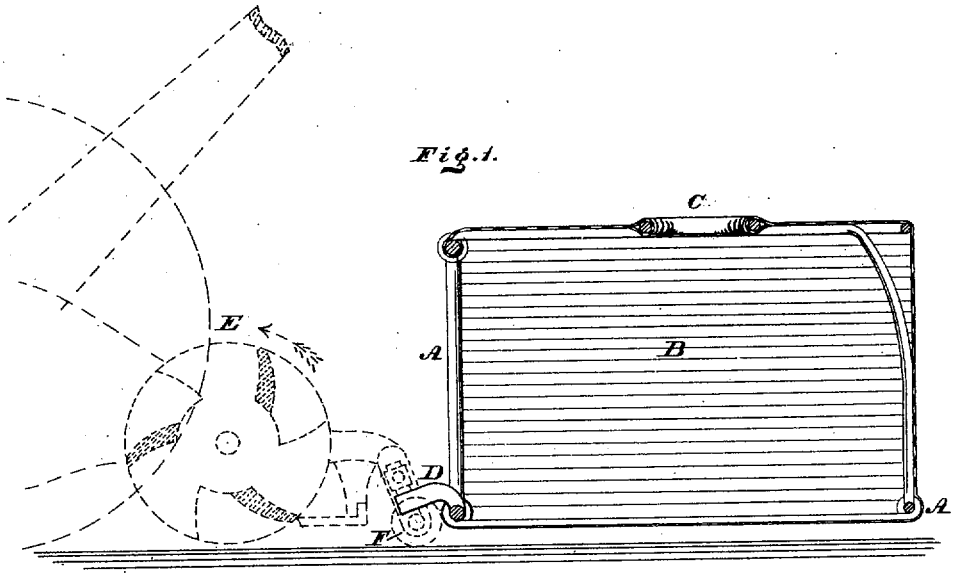
Figure 2:
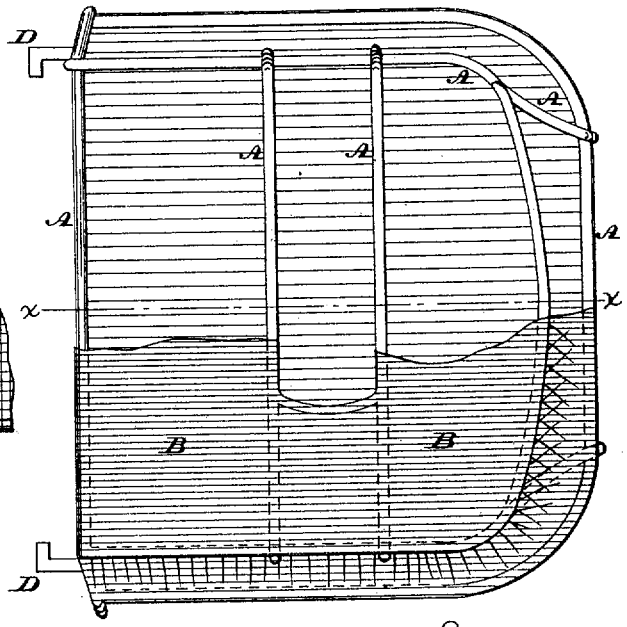
Figure 3:
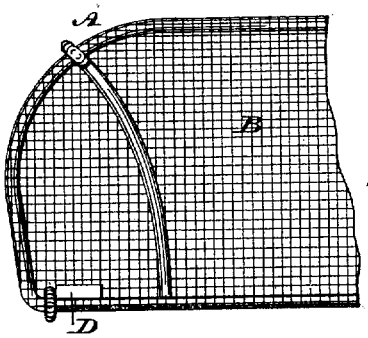

Figure 1 is a vertical section in line *x x*, Fig. 2, of the attachment embodying my invention. Fig. 2 is a plan view thereof, partly broken away. Fig. 3 is a view of a portion of the end adjacent to the mower.

Similar letters of reference indicate corresponding parts in the several figures.

My invention consists of a receptacle for catching and holding the grass cut by a lawn-mower, attached to the body of the mower in such manner as to be rigidly suspended therefrom, and sustained without the necessity of rollers, bails, &c., the body of the receptacle having an elastic frame and arms, the ends of which coincide with existing parts of the mower, so that said arms may be readily sprung into and out of position for securing and removing the receptacle.

Referring to the drawings, A represents a frame, formed of wire, properly shaped and fastened together, and having a covering, B, of muslin or other light and suitable fabric or material, drawn over the frame, and secured thereto by stitches or other proper means, thus forming a box or receptacle, it being noticed that the receptacle is left open at the end adjacent to the mower, and its top has an opening or man-hole, C.

Projecting from and secured to the lower portion of the frame A, at the open end thereof, are curved or bent arms D, the ends whereof are of angular form and adapted to enter slots at the rear of the body of the mower and snugly fit the walls thereof, said slots being shown in Fig. 1 as receiving the bearings of the small roller F. The arms D are fastened to the lower wire of the frame, which is sufficiently elastic, so that by springing apart one or both of the arms they may be readily applied to the body of the mower, and subsequently easily removed, when required.

It will be seen that as the mower is run forward the cut grass is thrown into the receptacle, strikes the top thereof in front of the opening C, and falls to the bottom of the receptacle, said opening permitting the hand of the operator to enter the receptacle and push the cut grass rearward and make room for more.

When the contents of the receptacle are to be discharged the mower-handle is tipped up and over, and the cut grass falls through the open end of the receptacle, or the receptacle is removed and emptied, the removal, when required, being accomplished simply by lateral pressure on the arms D.

It will also be seen that the receptacle or gatherer is rigidly secured to and suspended from the body of the mower, and remains sustained in position above the ground without the necessity of rollers or other supports underneath the receptacle, or bails or other devices attached to the handle of the mower. It follows the several motions of the mower, and always retains its position relatively to the cutters.

The receptacle as constructed will be found to be light, cheap, simple, and durable.

Having thus described my invention, what I claim as new, and desire to secure by Letters Patent, is—

A grass-gatherer consisting of a receptacle formed with an elastic frame and fastening-arms having ends adapted to coincident portions of a lawn-mower, so that the receptacle may be connected by springing the arms into engaging contact with said portions and disconnected by lateral pressure on the arms, substantially as stated.

C. G. BALDWIN.

Witnesses:
THOS. HARRIS,
H. M. LEMON.